United States Patent Office 2,693,255
Patented Nov. 2, 1954

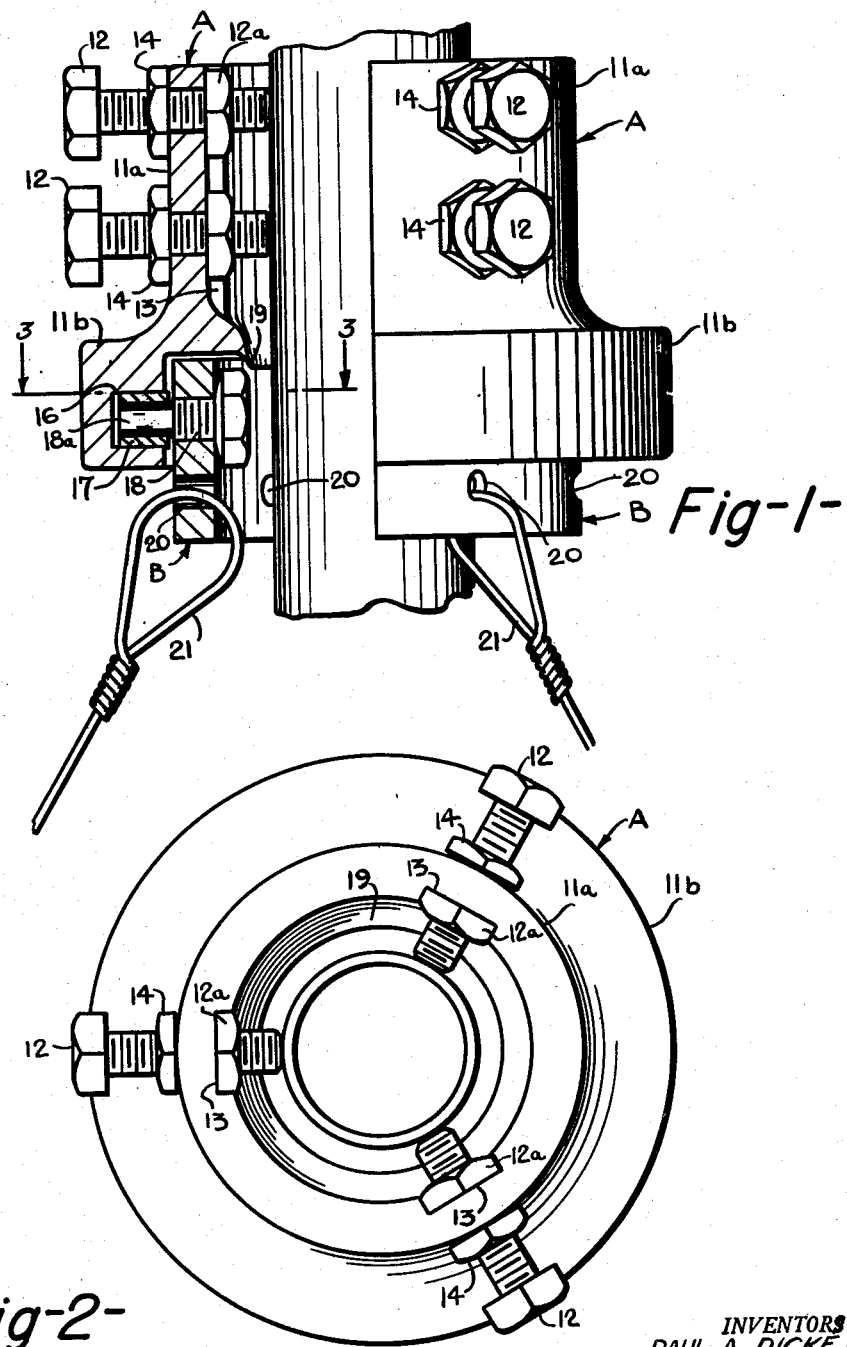

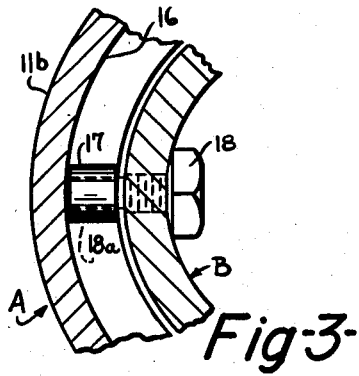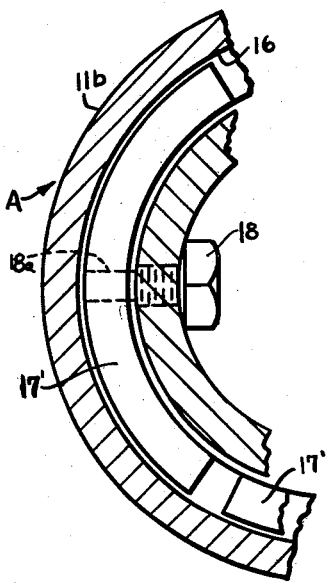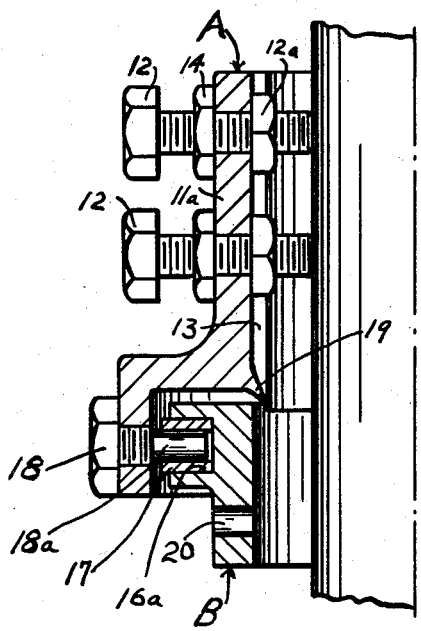

2,693,255

ANTIFRICTION GUY RING

Paul A. Dicke and Harry Gilbert, New Bremen, Ohio, assignors to Crown Controls Company, Inc., New Bremen, Ohio, a corporation of Ohio Application December 31, 1949, Serial No. 136,346

10 Claims. (Cl. 189—31.5)

This invention pertains to anti-friction guy rings and particularly to guy rings for supporting rotatable masts such as are commonly used for supporting antennas for television, short wave, and other radiant energy devices, although the use of the present invention is not limited thereto, as it may be used in other places where a thrust bearing is required. It is important that antennas for television, short-wave, and other radiant energy devices be properly oriented with respect to the broadcasting source, for example. To this end, the antenna is firmly mounted upon a rotatable mast so that rotation of the mast will produce the desired orientation of the antenna. Since such masts are usually slender and frequently quite high, they must be supported at one or more intermediate points by guy wires or the like. Such guy wires cannot be connected directly with the mast as this would interfere with the rotation of the latter.

An object of the present invention is to provide an improved guy ring and such rotatable masts as are simple and cheap to manufacture and consist of a minimum number of parts.

Another object is to provide such a guy ring having a roller or other anti-friction or low friction bearing so constructed that water due to rain, etc., cannot find access to the bearing surfaces. This minimizes corrosion of the bearings and freezing up during cold weather.

Another object is to provide a drip guard to deflect water away from the bearing proper.

Further objects and advantages of this invention will be apparent from consideration of the specification as illustrated by the accompanying drawings of possible embodiments of the invention, in which drawings:

Fig. 1 is a side view of our improved guy ring, certain parts being shown in section, the ends of the mast portion shown being broken away;

Fig. 2 is a top view of the form shown in Fig. 1;

Fig. 3 is a fragmentary horizontal cross-sectional view taken on the line 3—3 of Fig. 1;

Fig. 4 is a view similar to Fig. 3 showing the use of segmental shoes instead of rollers, and Fig. 5 is a view similar to Fig. 1, showing a modification.

Referring to said drawings, the forms illustrated consist essentially of a mast carried member designated generally A, and a stationary guy wire receiving member designated generally B. The mast carried member consists generally of a tubular upper portion 11a carrying at preferably three equally circumferentially spaced points two clamp screws 12, six in all, in the form shown. These may be threaded into threaded holes in the part 11a but to reduce the cost by eliminating the threading operation, we prefer to provide square nuts 12a for each clamp screw 12 which fit into notches 13 formed in the inner surface of the tubular portion 11a. Lock nuts 14 are provided to prevent loosening of the clamp screws. It will be seen that this construction provides a simple, low cost method for centering and securely attaching the member A to the mast, and for assuring that the axis of member A is parallel to or coincides with the axis of the mast.

The lower portion of the member A, designated 11b, is preferably of larger diameter and is formed with an annular recess 16 within which are received three or more rollers 17, journalled on a cylindrical pilot extension 18a of a screw 18 threaded into a corresponding hole in the tubular member B. It will be noted that this construction permits making the member A of a single piece. In order to assemble the parts, the rollers 17 are first placed in the annular recess 16. The ring B is then placed in position and the screws 18 turned into place with their cylindrical portions 18a entered into the bore of the respective rollers 17. This construction reduces the cost very considerably as it eliminates machining and fitting of parts which has been found necessary in prior construction. The rear of the head of screws 18 may be formed spherical as shown, or conical or otherwise formed so that engagement with the inner surface of member B will not take place at the corners of the heads of the screws 18.

The lower edge of the member B is preferably provided with a plurality, preferably six, of equally spaced holes 20, some or all of which receive the ends of guy wires 21.

It will be noted that by forming the parts as shown and described, the member A provides a rainproof housing for the bearing member proper. To give further protection, the member A is formed with a skirt portion 19 having a fairly sharp downwardly extending edge to assure that water entering the member A from the top will not enter the space above the upper edge of the member B where it might enter the annular recess 16 and contribute to corrosion or to freezing in cold weather.

It will be noted that instead of providing the rollers 17, segmental shoes might be provided in lieu thereof. Such a form of construction is illustrated in Fig. 4. In this form all of the parts are the same as in the earlier figures with the exception that, instead of using rollers 17, segmental shoes 17' are employed. As will be seen, these extend slightly less than one-third of the circumference so that they may be assembled into the annular recess 16. Thereafter, the member B is put into place and the screws 18 inserted, the pilot extension 18a thereof entering corresponding holes in the shoes 17'.

In the forms shown in Figs. 1 to 4, inclusive, it will be noted that the groove for the rollers 17 or bearing shoes 17' is formed in the mast carried member A and that the rollers or shoes are carried on the stationary guy wire receiving member B. Fig. 5 shows a modified construction in which the parts are reversed. It will be noted that the member B is formed with an outwardly facing groove 16a which receives the rollers 17 (or bearing shoes 17') supported on the pintle extensions 18a of screws 18 which are carried in the downwardly extending skirt portion of the member A. The operation is the same as that of the other forms shown.

It will be noted that the constructions shown and described will serve admirably to accomplish the objects stated above. It is to be understood, however, that the constructions disclosed above are intended merely as illustrative of the invention and not as limiting, as various modifications therein may be made without departing from the invention as defined by a proper interpretation of the claims which follow.

We claim:

1. In a guide ring, a tubular member, clamping means for clamping said tubular member to a mast or like device received therein, a guide wire receiving member and a plurality of screws threaded through one of said members and projecting into an annular bearing groove in the other of said members, the ends of the projecting screws carrying trunnions on which are mounted bearings which contact a wall of the annular bearing groove in the other of said members.

2. In a guy ring, a tubular member, clamping means for clamping said tubular member to a mast or like device received therein, said clamping means being carried near the upper part of said member, said member being formed with an enlarged circumferential portion at its lower end provided with an internal annular recess, a guy wire receiving member received within said lower enlarged portion of said first mentioned member, and bearing members extending outwardly from said guy wire receiving member into said internal recess in the first mentioned member.

3. The combination according to claim 2 in which the bearing members are formed with bores in which are received trunnions forming part of a screw threaded through said guy wire receiving member.

4. The combination according to claim 2 in which the bearing members are formed with bores in which are received trunnions removably carried by said guy wire receiving member.

5. In a guy ring, a tubular member, clamping means for clamping said tubular member to a mast or like device received therein, said clamping means being carried near the upper part of said member, said member being formed with an internal annular recess at its lower end, a guy wire receiving member received within said lower portion of said first mentioned member, formed with bearing members extending outwardly into said internal recess in the first mentioned member, and said first mentioned member being also formed with an annular inwardly extending shield, overlying the upper end of said guy wire receiving member.

6. In a guy ring, a tubular member, clamping means for clamping said tubular member to a mast or like device received therein, said clamping means being carried near the upper part of said member, said member being formed with an enlarged circumferential portion at its lower end provided with bearing members, a guy wire receiving member received within said lower enlarged portion of said first mentioned member and formed with an annular recess within which said bearing members are located.

7. In a guy ring, a tubular member, clamping means for clamping said tubular member to a mast or like device received therein, said clamping means being carried near the upper part of said member, said member being provided with an internal annular groove, a tubular guy wire receiving member coaxial with and rotatable relative to said first mentioned member extending into the lower portion of said first mentioned member beyond said groove, and rolling anti-friction members extending into said groove in the first mentioned member and so associated with said tubular guy wire receiving member as to support it for rotation relative to the first mentioned member.

8. In a guy ring, a tubular member adapted to surround a mast, clamping means for clamping said tubular member to such mast carried near the upper part of said member, said member being provided with an internal annular groove, a tubular guy wire receiving member coaxial with and rotatable relative to said first mentioned member extending into the lower portion of said first mentioned member beyond said groove, and rolling anti-friction members extending into said groove in the first mentioned member and so associated with said tubular guy wire receiving member as to support it for rotation relative to the first mentioned member, said first mentioned member being formed with an inwardly and downwardly extending annular shield overlying the upper end of said guy wire receiving member to prevent water, snow, or ice from reaching said anti-friction members.

9. The combination according to claim 8 in which said anti-friction members comprise cylindrical rollers.

10. The combination according to claim 8 in which anti-friction members comprise cylindrical rollers formed with axial openings which receive pintles carried by said guy wire receiving member.

References Cited in the file of this patent

UNITED STATES PATENTS

| Number | Name | Date |
| --- | --- | --- |
| 126,469 | Mackenzie | May 7, 1872 |
| 823,959 | Myers | June 19, 1906 |
| 917,349 | Opsal | Apr. 6, 1909 |
| 1,423,377 | Watts | July 18, 1922 |
| 1,473,935 | Horton | Nov. 13, 1923 |
| 1,533,019 | Link et al. | Apr. 7, 1925 |
| 1,844,650 | Hale | Feb. 9, 1932 |
| 2,258,267 | Shimer | Oct. 7, 1941 |

FOREIGN PATENTS

| Number | Country | Date |
| --- | --- | --- |
| 209,437 | Great Britain | of 1925 |
| 543,165 | Great Britain | of 1942 |
| 563,746 | France | Dec. 12, 1923 |